United States Patent [19]
Amies

[11] 3,922,185
[45] Nov. 25, 1975

[54] APPLYING ART WORK TO MOTION PICTURE FILM

[76] Inventor: Eric T. Amies, 1101 W. 43rd St., Vancouver, Wash. 98660

[22] Filed: July 2, 1973

[21] Appl. No.: 375,531

[52] U.S. Cl. .................... 156/57; 96/43; 96/45.1; 352/55; 352/90
[51] Int. Cl.² .. B44D 1/52; G03C 1/92; G03B 19/18
[58] Field of Search .................. 96/43, 45.1, 36.2; 117/8.5, 9, 33.5, 38; 40/134; 352/54, 55, 47, 89, 90

[56] References Cited
UNITED STATES PATENTS

| | | | |
|---|---|---|---|
| 2,174,931 | 10/1939 | Terry et al. | 352/47 |
| 2,689,917 | 9/1954 | Switzer | 40/134 |
| 2,843,004 | 7/1958 | Pajes | 96/43 |
| 2,914,404 | 11/1959 | Fanselau et al. | 96/36.2 |
| 2,992,107 | 7/1961 | Kaplan et al. | 96/45.1 |
| 3,115,417 | 12/1963 | Christesen | 117/33.5 R |

Primary Examiner—J. Travis Brown
Attorney, Agent, or Firm—Eugene D. Farley

[57] ABSTRACT

Titles, identifying indicia, figures, and other art work are superimposed on a motion picture film having a live action background by a modified aerial image cinematographic technique in which the art work is coated with a fluorescent pigment, interposed in the aerial image, back lighted, and photographed together with the image. The fluorescent pigment coating permits back lighting at a relatively low light intensity at which adequate color saturation of the film is achieved without producing corona, halo, burning and other adverse effects.

3 Claims, 4 Drawing Figures

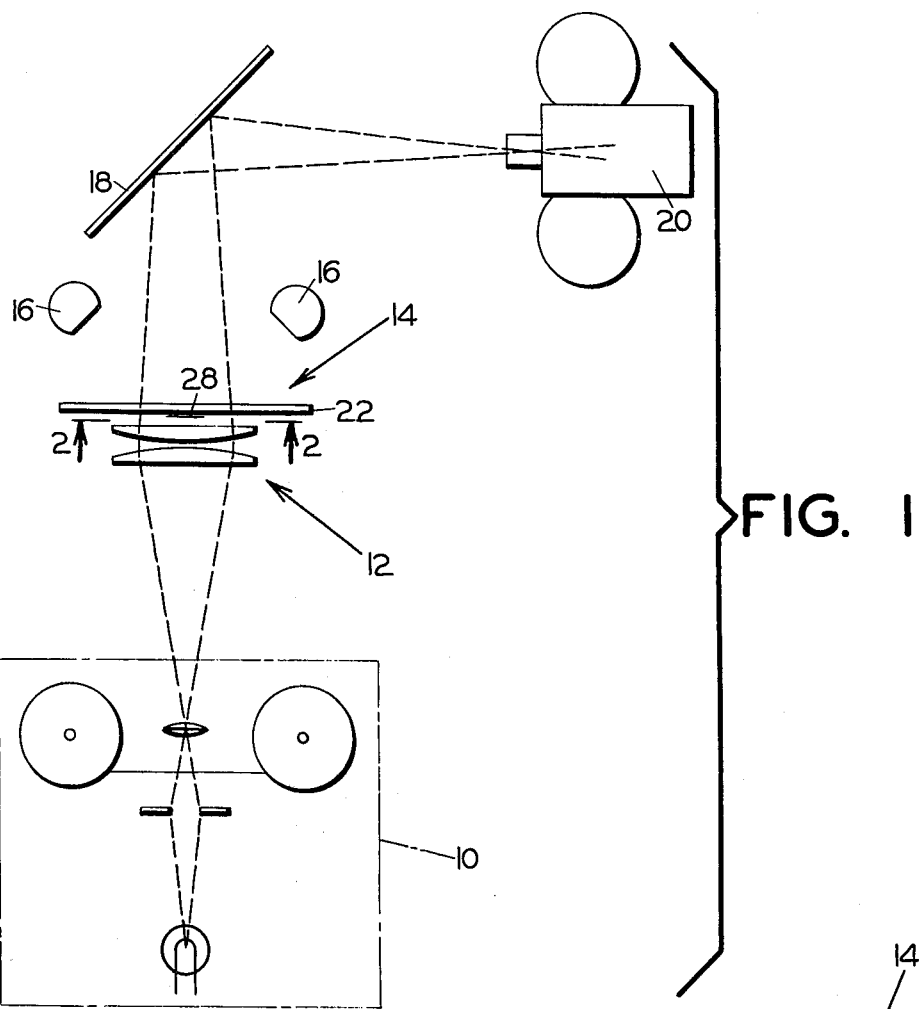
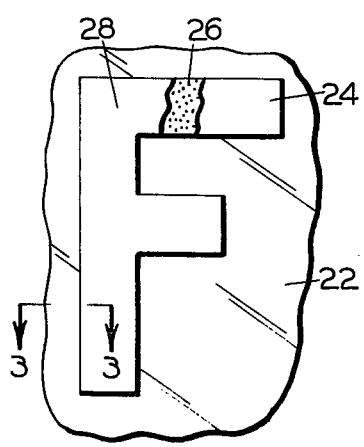
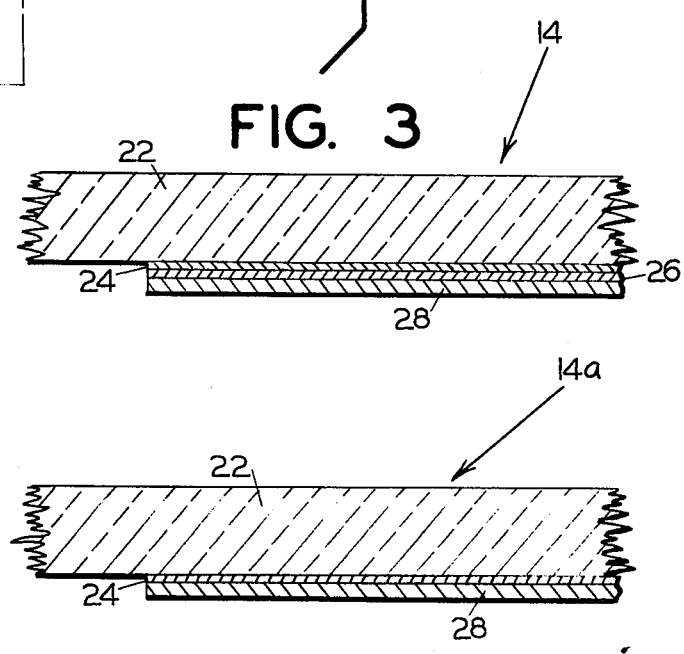
FIG. 1
FIG. 2
FIG. 3
FIG. 4

APPLYING ART WORK TO MOTION PICTURE FILM

BACKGROUND OF THE INVENTION

This invention relates to aerial image cinematography. It pertains particularly to a method for applying art work to motion picture film having a live action background using the technique of aerial cinematography.

The technique of aerial cinematography is widely used for combining titles, identifying indicia, advertising matter, figures, optical effects, and miscellaneous subject matter with live action backgrounds on motion picture film. In accordance with this technique, a projector, usually lying on its side, projects a master, positive film against a 45° front surface mirror which transmits the image to a field lens or condenser. The projected aerial image is focused at the top surface of the field lens which normally is flush with the top of a work table.

An aerial image is an image which comes to focus in space, rather than on a ground glass or piece of film. It is exemplified by the image seen through a magnifying glass, a telescope, a microscope, or a camera with the ground glass removed.

Titles or art work painted or printed on cels, or small articles such as packaged merchandise may be positioned on the surface of the field lens, in the aerial image. A camera focused on the field lens sees the aerial image as if it were a projected motion picture in the same plane as the art work placed on top of the field lens. It thus photographs a combination of the art work and the motion picture. In this manner the finished motion picture is produced with the selected subject matter or art work displayed against a live action background.

Although widely used, this technique has significant deficiencies.

Principal among these is the fact that the projected aerial image may overpower the art work so that the latter does not appear sharply, clearly and convincingly on the finished film. To overcome this deficiency it is necessary to use selected colors such as black or dark green for portrayal of the art work.

In the alternative, or additionally, it is necessary to preselect carefully the area of the film to which the art work is to be applied. If the wrong area is chosen, the subject matter of the art work may be absorbed by the intensity of color of the background image.

Attempts have been made to overcome the foregoing problem by back lighting the art work so that it reflects light of sufficient intensity to photograph efficiently and achieve the desired degree of color saturation of the film. To a limited extent, this expedient proves successful. However, if it is applied adequately to achieve success in all situations, the back lighting produces a corona or halo which detracts from the sharpness of the image. If the back lighting is of sufficient intensity it may even cause burning of the film.

It is the general purpose of the present invention to provide a method, and an article for use in the practice of the method, for superimposing art work on a motion picture film having a live action background, using the basic techniques of aerial image cinematography, but modifying them significantly so as to reproduce the art work in sharp image without corona or halo and without burning the film.

Still a further object of the present invention is the provision of a method for superimposing art work on motion picture film having a live action background which makes possible the use of art work of all colors and the use of standard type sizes in the composition of the art work while still achieving sharp images and adequate color saturation of the finished film.

Still another object of the present invention is the provision of a method for superimposing art work on a motion picture film having a live action background which makes it possible to locate the art work anywhere on the aerial image, regardless of its color and intensity.

Still another object of the present invention is the provision of a method for superimposing art work on a motion picture film having a live action background which makes possible the use of a zoom lens on the recording camera.

Still another object of the present invention is the provision of a method for superimposing art work on a motion picture film having a live action background which lends itself readily to incorporation in the techniques of aerial image cinematography as a modification thereof, using substantially the conventional units of apparatus, but without the necessity of working with the art work in a reversed position.

SUMMARY OF THE INVENTION

The foregoing and other objects of the invention are achieved by a method which basically comprises coating the art work surface which faces the recording camera with a fluorescent pigment. Because of the intensity of the light reflection from such pigments, the amount of back lighting required is minimal and is insufficient to cause the above noted adverse effects of corona, halo, and burning of the film.

As a result, there may be used in the preparation of the art work all manner of conventional type figures and numerals in all of the colors for which suitable fluorescent pigments are available. Also, the intensity of the reflected light is such that the art work may be positioned over any of the areas of the background aerial image irrespective of the identity or intensity of the color thereof.

In one illustrative technique, the art work is prepared by coating the surface of a glass slide or other cel with a fluorescent pigment soluble in water or other solvent, superimposing the letters, numerals or characters constituting the art work with or without the use of a suitable adhesive, and then washing away with a selected solvent the excess fluorescent pigment which is not covered by the art work.

This leaves the combination of the glass support having superimposed thereon a lamina consisting of the fluorescent pigment and superimposed laminae of glue (optional) and letter, number or other character. The transparent cel then may be placed on the field lens with the fluorescent side toward the recording camera, backlighted and filmed.

THE DRAWINGS

FIG. 1 is a schematic view in elevation of apparatus employed in aerial image cinematography modified for use with the hereindescribed technique of superimposing art work on a motion picture film having a live action background;

FIG. 2 is an enlarged fragmentary detail view in plan, partly broken away, illustrating art work employed in the execution of the presently described method;

FIG. 3 is an enlarged, fragmentary sectional view taken along line 3—3 of FIG. 2; and FIG. 4 is an enlarged, detail fragmentary sectional view similar to FIG. 3, but illustrating an alternate embodiment of the invention.

DETAILED DESCRIPTION OF A PREFERRED EMBODIMENT

As noted above, the present invention is applicable to the superimposition of titles, numbers, letters, identifying indicia, pictures, animated figures, optical effects and other subject matter on a motion picture film having a live action background. Such subject matter is termed broadly herein "art work". It is widely applied in commercial photographic laboratories to commercial and amature films of all categories.

The art work may be applied to various base materials, but preferably is applied to slides or cels comprising plates of clear glass or plastic. It also may be present, however, as a commercial article such as a printed package or label which per se is reproduced on the recording film superimposed over a live background.

In the application of the hereindescribed method, there are employed the same operational units that are employed conventionally in aerial image cinematography, although in a somewhat different arrangement. Referrring to FIG. 1 there thus is employed a conventional motion picture projector 10 in which is run the live film upon which the background of art work is to be superimposed.

The image from projector 10, reversed by the lens thereof, passes to a conventional field lens (condenser) 12. This lens normally is associated with a work table on which the art work indicated generally at 14 is supported.

The art work is back lighted by a light 16 employed for this purpose. The effect is to transmit an image which is a composite of the live background image of the original film, which is present as an aerial image as it is transmitted by field lens 12, and the image of the art work which is superimposed on and blots out certain areas of the aerial image.

This composite image passes to a 90° mirror 18 which reverses it and transmits in the horizontal plane to a conventional motion picture camera 20. The latter runs film on which the composite image is recorded. It sees this image in proper perspective because of the compensating effect of the lenses and mirror used in the system.

In the illustrated embodiment, art work 14 comprises a plate 22 made of clear glass or clear plastic having good properties of light transmission. As illustrated in FIGS. 2 and 3, the desired subject matter is applied to the plate by first coating the entire plate surface with a layer of suitable fluorescent pigment, preferably in the form of a solvent solution thereof.

Any of a wide variety of fluorescent pigments may be used for this purpose. Suitable ones are:

Yellow or chartreuse: naphthalimide
Green: phthalocyamine green plus naphthalimide
Red: naphthalimide plus rhodamine
Blue: phthalocyamine blue plus coumarine In addition, there may be used the following, or their fluorescent derivatives: anthracene, eosin, esculin, fluorescein and resorcin.

Other examples of suitable fluorescent pigments for use in this invention are described and set forth in U.S. Pat. Nos. 2,938,873 and 3,412,036.

For convenience of operation, it is preferred to use fluorescent pigments which are water soluble. They accordingly may be applied in the form of their water solutions and the excess pigment removed by washing with water.

After coating the entire cel or at least the work area thereof, with the selected pigment, indicated at 24 in FIG. 3, a coating of glue 26 is applied to the selected art work item 28. In the illustration, the art work item is the letter F.

The art work item 28 with the glue applied to its back surface then is placed in the desired location on cel 14. In so doing, it overlies a corresponding area of fluorescent pigment 24.

With the art work item tightly bound to the underlying support and sealing off the underlying layer of fluorescent pigment, the surface of the cel next is washed with water or other selected solvent for removal of the excess fluorescent pigment in its uncovered areas.

This procedure may be modified by applying a plurality of art work items to a single coating of fluorescent pigment. In the alternative, the sequence may be repeated using different items of art work and fluorescent pigments of different colors, thereby achieving desired colored effects.

Still another procedure is illustrated in FIG. 4. In this embodiment, advantage is taken of the fact that many solutions of fluorescent pigments have at least some quality of adhesiveness. Accordingly, the composite product is produced by coating cel 22 with a solution of fluorescent pigment 24 and then directly applying art work item 28 without first coating it with a layer of glue. The excess fluorescent pigment then is washed off from the uncovered areas of the cel. This results in the production of a composite 14a which also may be employed in the hereindescribed method.

In such method the composite unit 14 or 14a is placed in position on a work table as illustrated in FIG. 1.

Where the supporting cel 22 is of clear glass or plastic, the composite is placed upside down on the work table, in the FIG. 1 position. This directs the fluorescent lamina 24 toward the lens of camera 20.

Because of its manner of preparation the fluorescent lamina has the exact configuration of the overlying art work item 28. It is backed up by the art work item which normally is opaque and accordingly screens out the aerial image projected onto field lens 12 by projector 10.

The exposed fluorescent figure then is back lighted by means of light 16. Because of the intensity with which the fluorescent pigments reflect illumination, a minimum degree of back lighting is required.

Camera 20 sees the aerial image on field lens 12 and the superimposed art work defined in fluorescent color, all in proper orientation and position, and without corona or halo effects. This result is obtained no matter to what area of the aerial image the art work is applied, and no matter what the color of either image or art work. Furthermore, the image is sharp and well defined and may be viewed through a zoom lens if so desired. The art work accordingly may be photographed against a selected live action background effectively and with a high degree of accuracy.

Having thus described my invention is preferred embodiments, I claim:

1. The method of making an article for use in superimposing an outline art work on a motion picture film having a live action background by the technique of aerial image cinematography utilizing a recording camera, the method comprising:
   a. coating a transparent plate with a selected fluorescent pigment,
   b. securing adhesively an outline art work to a corresponding area of the coating, thereby confining the underlying fluorescent pigment, and
   c. removing the fluorescent pigment from the unconfined area of the plate.

2. The method of claim 1 wherein the outline work is secured to the fluorescent pigment coating by applying an adhesive to the art work and thereafter applying the adhesive-coated surface to the pigment-coated surface.

3. The method of claim 1 wherein removal of the fluorescent pigment from said unconfined area of the plate is accomplished by washing the plate with a solvent for the pigment.

* * * * *